United States Patent [19] [11] 4,341,727
Landsness et al. [45] Jul. 27, 1982

[54] PROCESSING VINYL EXTRUDATE

[75] Inventors: Clifford A. Landsness, Akron; William R. Rinker, Cuyahoga Falls; Thomas E. Barnes, Clinton; Maurice E. White, Akron, all of Ohio

[73] Assignee: The B. F. Goodrich Company, Akron, Ohio

[21] Appl. No.: 225,070

[22] Filed: Jan. 14, 1981

[51] Int. Cl.[3] .............................................. B29C 17/08

[52] U.S. Cl. ..................................... 264/145; 264/153; 264/156; 264/163; 264/167; 264/284; 425/291; 425/298; 425/377; 425/DIG. 37; 425/DIG. 109

[58] Field of Search ............... 264/145, 153, 156, 175, 264/297, 284, 163, 167; 425/142, 290-292, 298, 328, 377, DIG. 37, DIG. 109

[56] References Cited

U.S. PATENT DOCUMENTS

| | | | |
|---|---|---|---|
| 753,981 | 3/1904 | Hoelsche | 425/291 |
| 2,717,419 | 9/1955 | Dickey | 264/297 |
| 3,107,394 | 10/1963 | Varon | 425/290 |
| 3,134,138 | 5/1964 | Pufahl | 425/DIG. 37 |
| 3,318,267 | 5/1967 | Artiaga et al. | 425/290 |
| 3,465,384 | 9/1969 | Barchi et al. | 425/291 |
| 3,524,922 | 8/1970 | Johnson | 264/145 |
| 3,703,432 | 11/1972 | Koski | 264/156 |

*Primary Examiner*—Jeffery R. Thurlow
*Attorney, Agent, or Firm*—Joseph Januszkiewicz

[57] ABSTRACT

The manufacture of perforated vinyl strips by feeding the strip material continuously without interruption to a punching apparatus that has two pairs of cooperative rotary dies that punch out closely spaced perforations with the first pair of dies scoring the perforations and the second pair punching out the perforations.

6 Claims, 10 Drawing Figures

FIG. 3
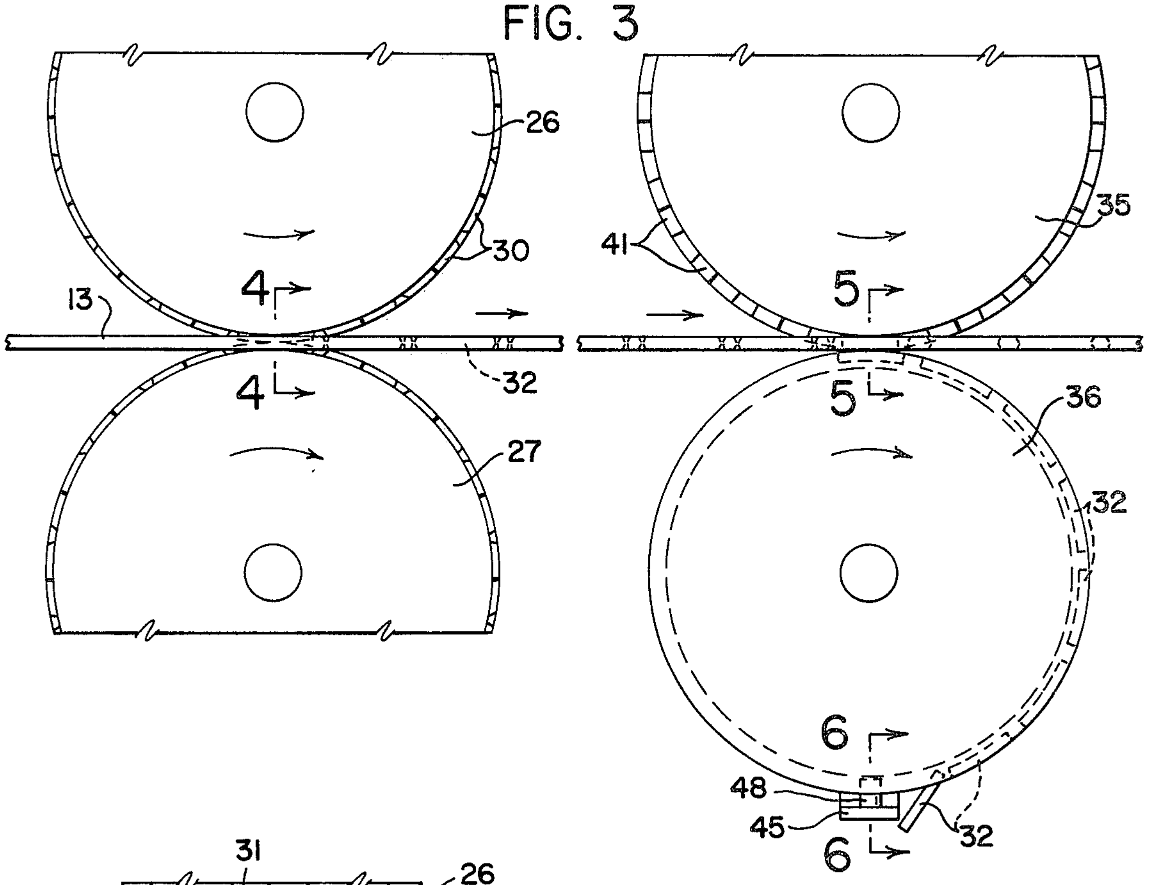
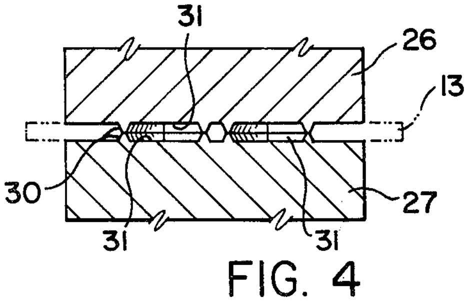
FIG. 4
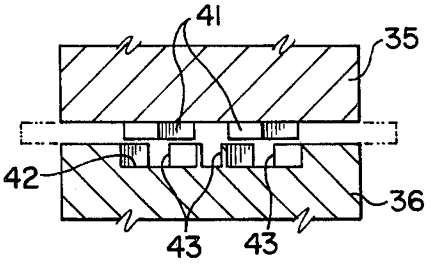
FIG. 5
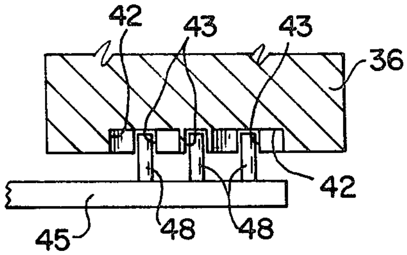
FIG. 6

PROCESSING VINYL EXTRUDATE

PROCESSING VINYL EXTRUDATE BACKGROUND OF THE INVENTION

This invention relates to the manufacture of perforated vinyl strips of material and more particularly to the perforation of a continuously extruded vinyl strip.

Heretofore in the manufacture of perforated vinyl strips it has been necessary to constrain the extrusion rate to permit the use of a reciprocating punching system on a continuous process system, otherwise it was necessary to provide a two part system wherein one separate operation was either to mold or extrude a vinyl strip and store such product, followed by a second separate operation which required the punching out of the perforation by a reciprocating puncher. The present invention improves the operation by providing a continuous two step rotary punching operation which permits the speeding up of the extrusion process thereby making the manufacturing of the perforated vinyl strips a single operation. In addition to speeding up the manufacturing process, considerable time is saved in handling the product between operation by eliminating this function.

SUMMARY OF THE INVENTION

The present invention contemplates the use of spaced pairs of rotary dies that cooperatively punch out closely spaced perforations on a linear moving vinyl narrow strip of an extrudate which is continuously extruded upstream of the punching operation. A first pair of dies cut and score the vinyl strip in preparation for the second pair of dies which punch out the scored perforations.

BRIEF DESCRIPTION OF THE DRAWINGS

FIG. 3 is an enlarged fragmentary side elevational view of the longitudinally spaced die cutting roll and die punch out rolls of the die cutting machine.

FIG. 4 is a fragmentary cross sectional view of the male die cutting rolls taken on line 4—4 of FIG. 3.

FIG. 5 is a fragmentary cross sectional view of the die punch out rolls taken on line 5—5 of FIG. 3.

FIG. 6 is a fragmentary cross sectional view of the lower peripheral portion of the die roll taken on line 6—6 of FIG. 3 showing a plurality of strippers.

DETAILED DESCRIPTION

Figures 1, 2, 7, 8, 9, 10:
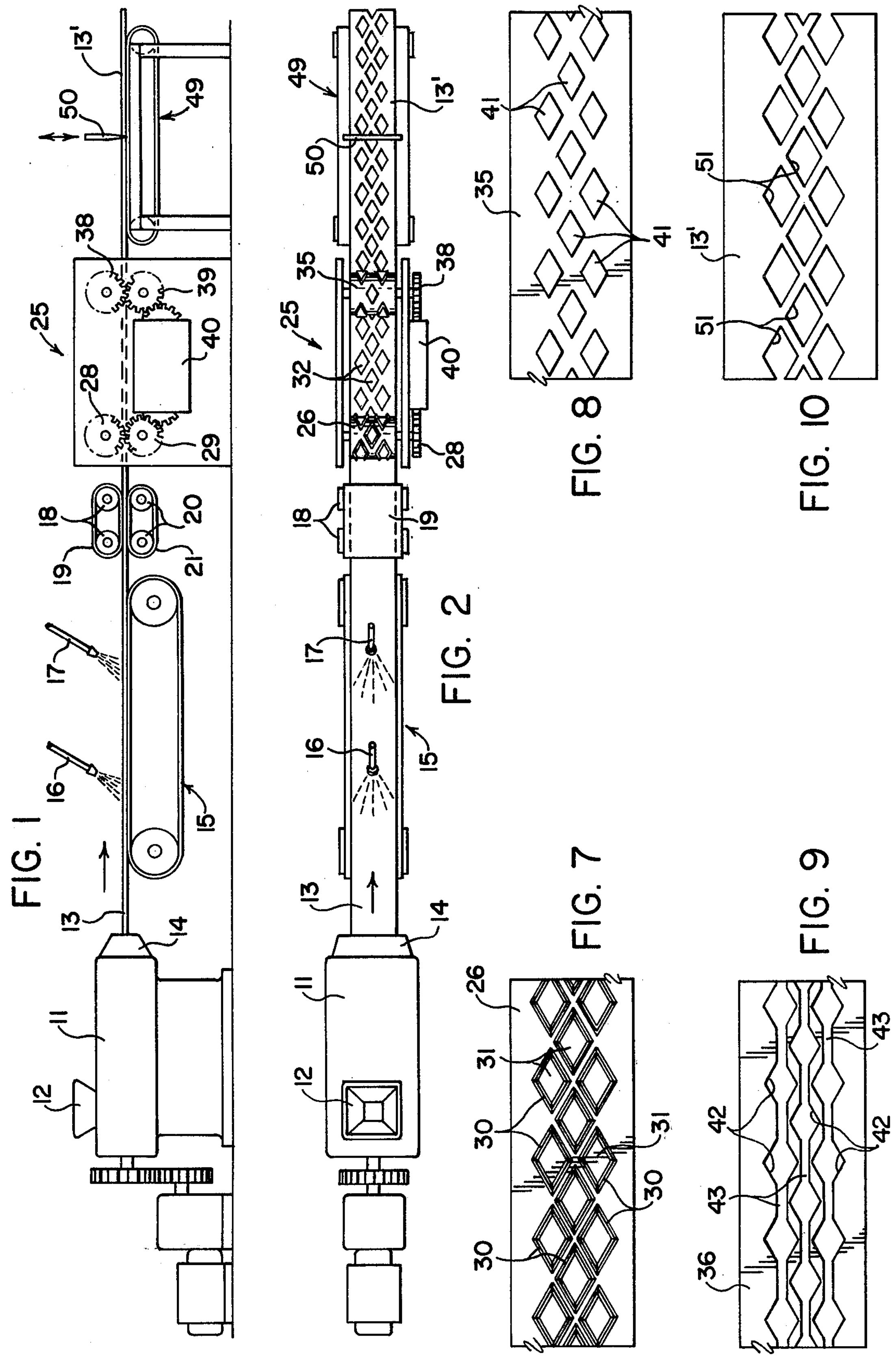
FIG. 1 is a schematic side elevational view of the preferred embodiment of a continuous die punching machine.
FIG. 2 is a schemmatic plan view of the continuous die punching machine.
FIG. 7 is a linear plan view of the arcuate peripheral surface of a cutting die.
FIG. 8 is a linear plan view of a portion of the arcuate peripheral surface of an upper male punch out die.
FIG. 9 is a linear plan view of a portion of the arcuate peripheral surface of a lower punch out die complimentary to the upper punch out die of FIG. 8.
FIG. 10 is a plan view of the end product of the continuous die punching machine showing a perforated vinyl extrusion article.

Referring to the drawings, wherein like reference numerals designate like or corresponding parts throughout the several views, there is shown in FIG. 1 an extruder 11 having a hopper 12 which provides the means for introducing into the extruder a suitable mixed blend for extrusion as a thin vinyl strip 13 through a die head 14. The vinyl strip 13 is directed to a conveyor 15 where the vinyl strip 13 is cooled as by air from suitable means shown schemmatically as air from conduits 16 and 17. Downstream of the conveyor 15 are a pair of upper rollers 18 along with an endless belt 19 cooperative with a pair of rollers 20 along with an endless belt 21 to convey the cooled vinyl strip to a continuous die punching machine 25.

Punching machine 25 shown schemmatically in FIG. 1 has a pair of identical rotary die cutting rolls 26 and 27 (FIG. 3) journaled at the forward portion thereof. Rolls 26 and 27 are synchronized in their rotation by intermeshing gears 28 and 29 which are keyed to the shafts that support rolls 26 and 27 respectively. The peripheral surfaces of the die cutting rolls 26 and 27 have a plurality of identical diamond shaped projections 30 which define recesses 31 within each diamond shape thereof and a reduced surrounding area to provide a plurality of reliefed diamond shaped dies. As the rotary die cutting rolls 26 and 27 rotate, they score the linear moving vinyl strip 13 from each side, to substantially condition the vinyl strip for providing a continuous perforated strip. The respective opposed projecting cutting edges of the diamond shaped dies 26 and 27 provide a small clearance space as seen in FIG. 4 to prevent premature rupture of the diamond shaped plugs 32. Journaled for rotation in the punching machine 25 and in alignment with the pass line of rotary die cutting rolls 26 and 27 are rotary die punch out rolls 35 and 36 driven in synchronesm with the rolls 26 and 27 by drive gears 38 and 39 along with other gears in transmission box 40.

Die punch 35 has a plurality of diamond shaped projections 41 defining recesses therebetween. Die punch 36 has a plurality of diamond shaped recesses 42 interconnected along their apexes by channels 43. The diamond shaped recesses 42 on die punch 36 are complimentary to the diamond shaped projections 41 to facilitate the punching out of the scored diamond shaped plugs or impressions 32 made by the cooperative rotary die cutting rolls 26 and 27. The transmission box 40 is so timed to advance the vinyl strip 13 between the rolls 26–27 and rolls 35–36 to locate the scored diamond shaped plugs with the punching out operation of rolls 35–36.

Located on die punching machine 25 at the lower peripheral portion of roll 36 is a laterally extending support member 45. Support member 45 supports a plurality of vertically extending rods 48 that extend into the channels 43 of punch out die 36 to act as ejectors or strippers to remove the punched out diamond shaped blanks or plugs from the recesses 43 of die 36.

The punched out rigid vinyl strip moves away from the punching machine 25 onto discharge conveyor 49 where the vinyl strip is cut into predetermined lengths of vinyl strips 13' by a guillotine cutter 50 in a manner old and well known in the art. Each vinyl strip 13' has a plurality of punched out recesses 51 and although three rows of recesses are shown the number of aligned rows may be more or less than those shown.

The process for punching a continuously moving vinyl strip of material by the above described includes the extruding of a thin strip of material. The process is particularly adapted to the narrow width material although the invention is not limited thereto. The extrudate is cooled while being conveyed and is directed to a first rotary embossing station where a pair of rotary male die members emboss the upper and lower surface along identical aligned shapes leaving a thin membrane to interconnect the blanks or the embossed shapes. The moving sheet material is thence directed to a second pair of cooperative rotary die which are driven in synchronism with the first pair of die means whereby a plurality of male die members cooperate with a plurality of female die members on the other one of the pair of rotary dies to sever or shear the thin membrane and punch out the blanks.

It will be apparent that, although a specific embodiment has been described in detail various modificiation are contemplated and may be resorted to by those skilled in the art without departing from the described invention, as hereinafter defined by the appended claims, as only a preferred embodiment thereof has been disclosed.

We claim:

1. An apparatus for the continuous processing of an extruded vinyl strip comprising an extruder for extruding a thin vinyl strip of material, a punching machine mounted in alignment with said extruder, conveyor means mounted between said extruder and punching machine for conveying said vinyl strip from said extruder to said punching machine, said punching machine having a first pair of cooperative rotary die means for receiving said vinyl strip in their bite portion, a second pair of cooperative rotary die means having a bite portion in alignment with said bite of said first pair of rotary die means, each of said first pair of rotary die means having male die cutting means on the peripheral surface thereof, operative to perform embossing cuts on said vinyl strip, one of said second pair of rotary die means having a plurality of male punchout die means on the peripheral surface thereof, and the other one of said second pair of rotary die means having a plurality of female die means on the peripheral surface thereof complimentary to said male punch out die means to facilitate the removal of the blanks punched by said punching machine.

2. An apparatus for the continuous processing of an extruded vinyl strip as set forth in claim 1 wherein said male die cutting means are cooperative at the bite portion to substantially score through said vinyl strip leaving a thin membrane interconnecting the embossed cut portion.

3. A process for stamping out a plurality of closely spaced blanks out of a thin sheet of material comprising the steps of extruding a sheet of vinyl material, cooling said material as said material is conveyed, embossing said sheet material on the upper and lower surface at a first station along aligned shapes leaving a thin membrane interconnecting each of said blank with said sheet material, and punching out said membrane of each of said blanks at a second station.

4. A process for stamping out a plurality of closely spaced blanks as set forth in claim 3 wherein said embossing consists of the simultaneous penetration of opposing surfaces to leave said thin membrane at the center of said sheet material.

5. A process for stamping out a plurality of closely spaced blanks as set forth in claim 4 wherein said punching out of said blanks consists of shearing said thin membrane with a pair of opposed die members.

6. A process for stamping out a plurality of closely spaced blanks as set forth in claim 5 wherein said punching out is done by a male and female die complimentary in shape.

* * * * *